US008323838B2

(12) United States Patent
Shembel et al.

(10) Patent No.: US 8,323,838 B2
(45) Date of Patent: Dec. 4, 2012

(54) SOLID POLYMER ELECTROLYTE FOR SOLAR CELLS AND LITHIUM BATTERIES

(75) Inventors: Elena M Shembel, Coral Springs, FL (US); Tatyana B. Zheltonozhskaya, Kiev (UA); Larisa R. Kunitskaya, Kiev (UA); Svetlana A. Berkova, Kiev (UA); Timofiy V Pastushkin, Ft. Lauderdale, FL (US); Volodymyr I. Redko, Coral Springs, FL (US); Irina M. Maksyuta, Dnipropetrovsk (UA); Nataliya M. Permyakova, Kiev (UA); Alexei YU. Kolendo, Kiev (UA)

(73) Assignee: Enerize Corporation, Coral Springs, FL (US)

(*) Notice: Subject to any disclaimer, the term of this patent is extended or adjusted under 35 U.S.C. 154(b) by 381 days.

(21) Appl. No.: 12/584,733

(22) Filed: Sep. 12, 2009

(65) Prior Publication Data

US 2010/0092870 A1    Apr. 15, 2010

Related U.S. Application Data

(60) Provisional application No. 61/191,913, filed on Sep. 12, 2008.

(51) Int. Cl.
*H01M 6/18* (2006.01)
(52) U.S. Cl. .................. 429/312; 429/231.1; 429/305; 427/402
(58) Field of Classification Search .................. 429/312, 429/305, 231.1; 427/402
See application file for complete search history.

(56) References Cited

U.S. PATENT DOCUMENTS

| | | | |
|---|---|---|---|
| 7,026,071 B2* | 4/2006 | Mayes et al. | 429/305 |
| 2003/0152703 A1* | 8/2003 | Hammond et al. | 427/256 |
| 2003/0157260 A1* | 8/2003 | Rubner et al. | 427/402 |
| 2005/0181280 A1* | 8/2005 | Ceder et al. | 429/231.1 |
| 2008/0099734 A1* | 5/2008 | Chiang et al. | 252/518.1 |

* cited by examiner

*Primary Examiner* — Vasu Jagannathan
*Assistant Examiner* — Henry Hu
(74) *Attorney, Agent, or Firm* — Morgan Lewis & Bockius LLP; Richard F. Trecartin

(57) ABSTRACT

The invention described the highly conducting amorphous polymer materials which are based on the pure block-type copolymers, which contain polyethylene oxide and other chemically complementary blocks and form the amorphous hydrogen-bonded intramolecular polycomplexes, and those, filled by ion conductive materials, low-molecular-weight organic plasticizer and nanometer-scale inorganic particles. The block-type copolymers are preferably the linear triblock copolymers with a central block of PEO and two side blocks of chemically complementary polyacrylamide (PAAm) or poly(acrylic acid) (PAAc). Due to existence of long side PAAm chains and their interaction with a central crystallizable block of PEO, TBC bulk structure is amorphous and fully homogeneous. It can be represented as a totality of hydrogen-bonded segments of both polymer components, uniformly distributed in PAAm matrix. Presented polymer materials can be used for solid polymer electrolyte for DSSC solar cells and lithium batteries.

23 Claims, 6 Drawing Sheets

SOLID POLYMER ELECTROLYTE FOR SOLAR CELLS AND LITHIUM BATTERIES

CROSS-REFERENCE TO RELATED APPLICATIONS

Provisional Patent Application No. 61/191,913, Filed Sep. 12, 2009

FEDERALLY SPONSORED RESEARCH

None

SEQUENCE LISTING

None

FIELD OF THE INVENTION

The present invention relates to the solid polymer electrolyte for Li-ion batteries, dye-sensitized solar cells and organic solar cells. For these devices a non-corrosive, high conductive, electrochemically and chemically stable, low cost electrolyte is very important. The solid solvent free polymer electrolyte based on amorphous polymer materials could be the best for these purposes.

BACKGROUND

For application in lithium batteries, dye-sensitized solar cells, organic solar cells it is important to develop a non-corrosive, low cost, high level conductivity, and efficient electrolyte.

For example, the electrolyte that is currently used in DSSC solar cell is classed as poisonous, dangerous and corrosive. The high level of corrosive activity of electrolyte does not allow replacement of the Ti foil with another material. Development of new electrolyte could provide the possibility to utilize low cost materials for the anode substrate instead of Ti-foil. For example, it may be possible to replace Ti foil with Al foil.

Optimization DSSC, organic solar cells and Li-batteries request decreasing the internal resistance. For this goal the optimization of the properties of electrolyte is very important. Electrolytes must have high level of conductivity, chemical and electrochemical stability and high reliability over a long period within a wide range of operating temperatures. In the cased of DSSC and organic solar cells electrolyte must have a good transparency For the purpose of thin film lithium batteries, DSSC and organic solar cell characteristic optimization and increasing serviceability it is important in particular, elimination of electrolyte leakage, using solid polymer electrolyte.

In the case of lithium batteries it must be solvent free polymer electrolyte with wide operation range of the potentials for the electrochemical stability.

In the case of the DSSC it must be red/ox active solid phase polymer electrolyte.

The Red/Ox couple in the electrolyte is of crucial importance for stable operation of a DSSC, because it must carry the charge between the photoelectrode and the counter-electrode for regeneration of the dye. After electron injection, the electron donor in the electrolyte must reduce the oxidized dye to the ground state as rapidly as possible. Thus, the choice of this charge mediator should take into account its redox potential, which must be suitable for regeneration the dye. Also, the redox couple must be fully reversible and should not exhibit significant absorption in visible light. Another important requirement is related to the solvent, which should permit the rapid diffusion of the dye from the oxide surface.

Polymer electrolytes may be the best option for this purpose. The poly(ethylene oxide) (PEO)-based solid polymer electrolytes have many potential applications in solid-state lithium batteries, dye-sensitized solar cells and organic solar cells.

The ionic conductivity of polymer electrolytes and their interfacial contact with electrodes are increased markedly by:
- development of polymer electrolytes based high-molecular poly(ethylene oxide) (PEO with $M_w$=1,000,000) modified (plasticized) by oligomer propylene oxide derivatives (with $M_w$=725);
- optimization of the terminal groups of propylene oxide and ethylene oxide derivatives ($M_w$=400-500) using them in oligomeric electrolytes;
- development of electrolytes based on low-molecular weight poly(ethylene glycol) ($M_w$=1,000) with [2-(6-isocyanatohexyleaminocarbonylamino)-6-methyl-4[1H]pyrimidinone] providing quadruple hydrogen bond sites;
- development of composite polymer electrolyte comprising PEO/DME, fumed silica, iodide salt and iodine.

Nevertheless, it is necessary to note, that the developed electrolytes have not high enough conductivity, which at room temperature makes is $9.34*10^{-5}$ S·cm$^{-1}$, $2.57*10^{-5}$ S·cm$^{-1}$, $5.28*10^{-5}$ S·cm$^{-1}$, accordingly, for the above electrolyte systems.

All the above electrolytes have essential disadvantage because of the presence of PEO (poly(ethylene oxide) or PPO (poly(propylene oxide) in their composition. It is known that PEO is characterized by a low glass transition temperature ($T_g$=−50° C.), but a regular structure favors a high degree of crystallinity (~80%), with a melting point at $T_f$=65° C.

To obtain amorphous materials at ambient temperature, it is necessary to introduce some "disorder" in the structure of polymer matrix. This is achieved by cross-links in the network using co-polymers of PEO (for example, co-polymers of polyepichlorohidrins), or by incorporating into polymer matrix of silica or other oxides.

Under operation conditions, the problem of polymer electrolyte crystallization can effect significantly on long stable work of the device on its basis. There may also be a decrease in the performance efficiency of dye-sensitized solar cells in the field at low temperatures because of probable reduction of conductivity from such electrolytes.

Crystallization of PEO sharply reduces mobility of their segments and decreases a conductivity of a polymer matrix. That is why numerous efforts were done to find the ways to enhance an ionic conductivity of the PEO-containing electrolytes and simultaneously to lower or even to prevent the crystallization phenomenon. For this purpose the following operations were carried out:
- For the lithium batteries the alkali metal salts with the large volume of anion ($ClO_4^-$, $BF_4^-$, $PF_6^-$, $N(SO_2CF_3)_2^-$, $N(SO_2CF_2CF_3)_2^-$ and others) were introduced in the content of polymer electrolytes.
- Terminal groups on the PEO chains were modified.
- PEO chains were included in the content of block and graft copolymers together with amorphous components such as poly(propylene oxide), polystyrene, poly(alkyl (meth)acrylates), due to this above copolymers are also used as matrices in the hard electrolytes.

In the case of the linear block copolymers the largest decrease in the crystallinity degree, $X_{cr}$, was observed in the triblock copolymers with PEO central block and two side amorphous blocks. When the length of side blocks became higher than some critical value, depending on their chemical nature and PEO length, the triblock copolymer fully lost its ability to crystallize. In the graft copolymers, containing PEO grafts, the value of $X_{cr}$ decreased the larger the less the length and quantity (density) of grafted chains. The relationship between $X_{cr}$ and the parameters pointed was reverse for the graft copolymers with the main chain of PEO.

There is also once more way for a production of hard polymer electrolytes with practically full suppression of PEO crystallization, namely application as matrices the intermolecular polycomplexes (InterPC) of PEO with polyacids and other proton-donor polymers, which ones form due to hydrogen bonds. Indeed, the amorphous bulk structure of such InterPCs and their high binding ability with respect to ions, organic substances and colloid particles is well known. At the same time, their main drawback such as possibility to disintegrate to separate components under the effect of external stimuli (for example, of the temperature) or strong competitors (the solvent molecules, ions and other additives), which are capable to destruct the H-bond system, is also well known. This one can negatively influence on the formation of multicomponent polymer electrolytes, based on InterPC, of a solution and their following exploitation.

Taking into account the need to improve DSSCs and lithium batteries efficiency, it seems to us that for creation of polymer electrolytes, it is reasonable to use principally new approaches and materials providing high conductivity and stable operation over a wide temperature range.

BRIEF DESCRIPTION OF THE INVENTION

According to the present invention we have discovered that the pure block-type copolymers, which contain polyethylene oxide (PEO) and other chemically complementary blocks and form the hydrogen-bonded intramolecular polycomplexes, and those, filled by low-molecular-weight electrolytes, are highly conducting amorphous polymer materials. Their thin films have many potential applications in dye-sensitized solar cells, solid-state lithium batteries, and organic solar cells.

The block-type copolymers are preferably the linear triblock copolymers with a central block of PEO and two side blocks of chemically complementary polyacrylamide (PAAm) or poly(acrylic acid) (PAAc). The preferable molecular weight of PEO in the PAAm-b-PEO-b-PAAm triblock copolymers is situated in the range $1 \cdot 10^4 < M_{PEO} < 1 \cdot 10^5$; the ratio between the average polymerization degrees of the side and central blocks, $P_{nPAAM}/P_{nPEO}$, is preferably equal from 0.5 to 20.

The low-molecular-weight electrolyte in the triblock copolymer matrices for dye-sensitized solar cells is preferably redox couple $KJ/J_2$ with a molar ratio from 1:1 to 2:1, consequently. The preferable relations between PAAm-b-PEO-b-PAAm triblock copolymer and KJ in their blends are equal from 10 to 60 (base-mole/mole). Thin films (~80-150 μm) of the pure triblock copolymers and their blends with the couple $KJ/J_2$ showed high level of an ionic conductivity within $2 \cdot 10^{-6} - 9.4 \cdot 10^{-3}$ S·cm$^{-1}$.

DETAILED DESCRIPTION OF THE INVENTION

Figure 1:
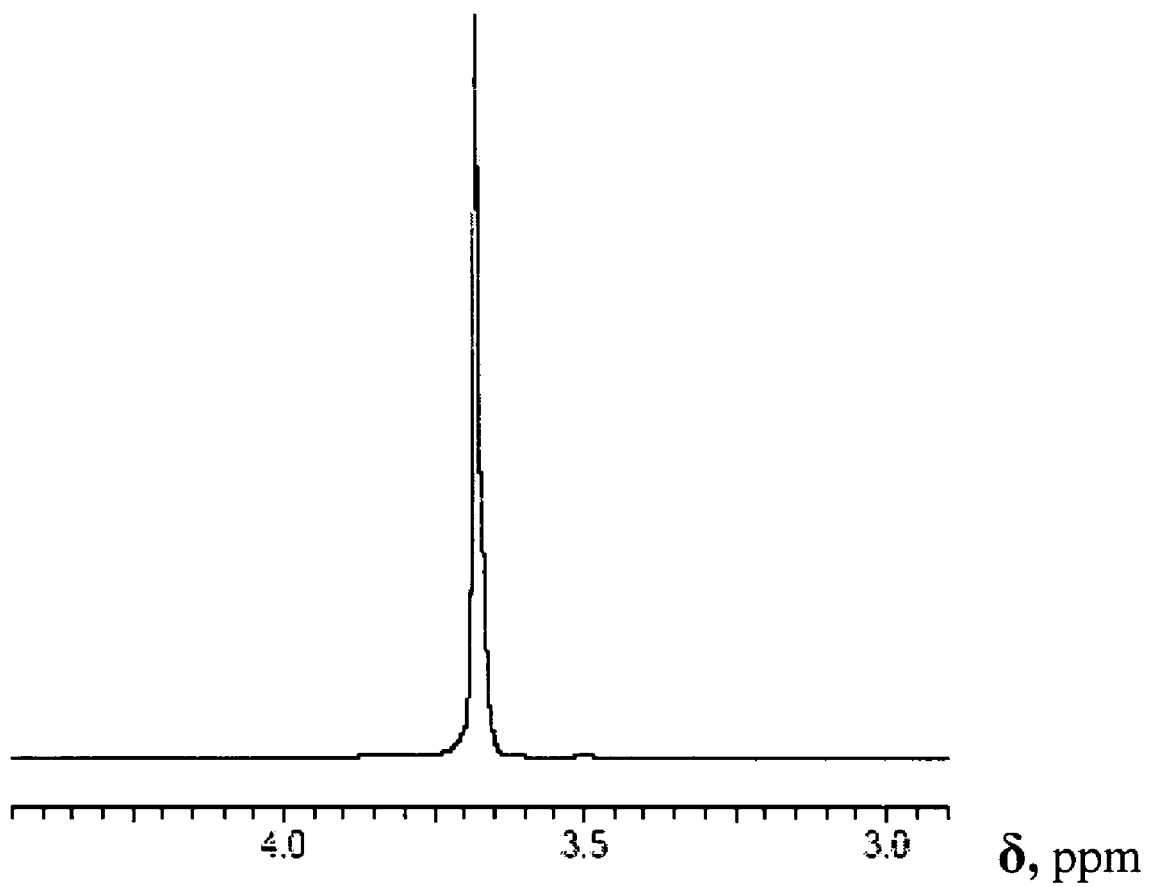
FIG. 1a illustrates the $^1$H NMR spectra for PEG2 in $D_2O$. C=10 кг·м$^{-3}$, T=20° C.
FIG. 1b illustrates the $^1$H NMR spectra for PAAm in $D_2O$. C=10 кг·м$^{-3}$, T=20° C.
FIG. 1c illustrates the $^1$H NMR spectra for PAAm-b-PEO-b-PAAm triblock copolymer (TBC2) in $D_2O$. C=10 кг·м$^{-3}$, T=20° C.
Figure 1:
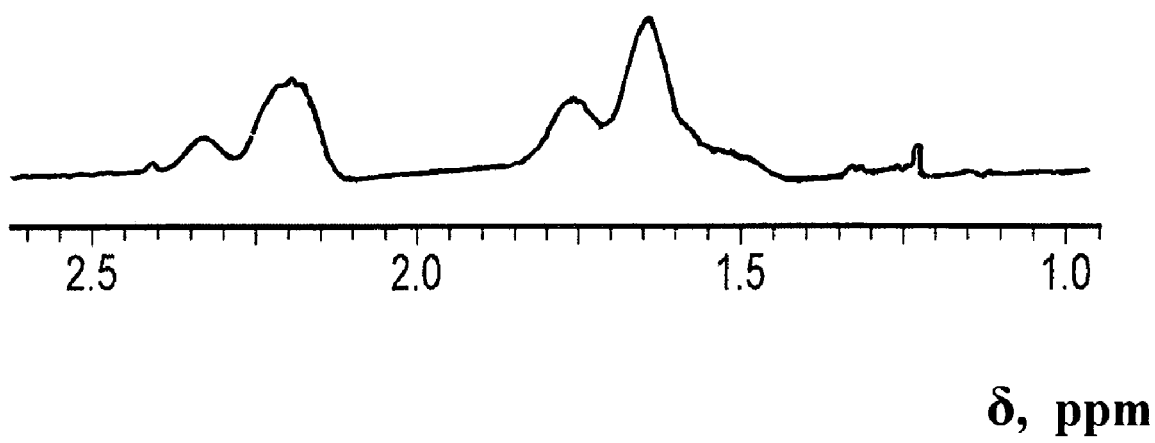
Figure 1:
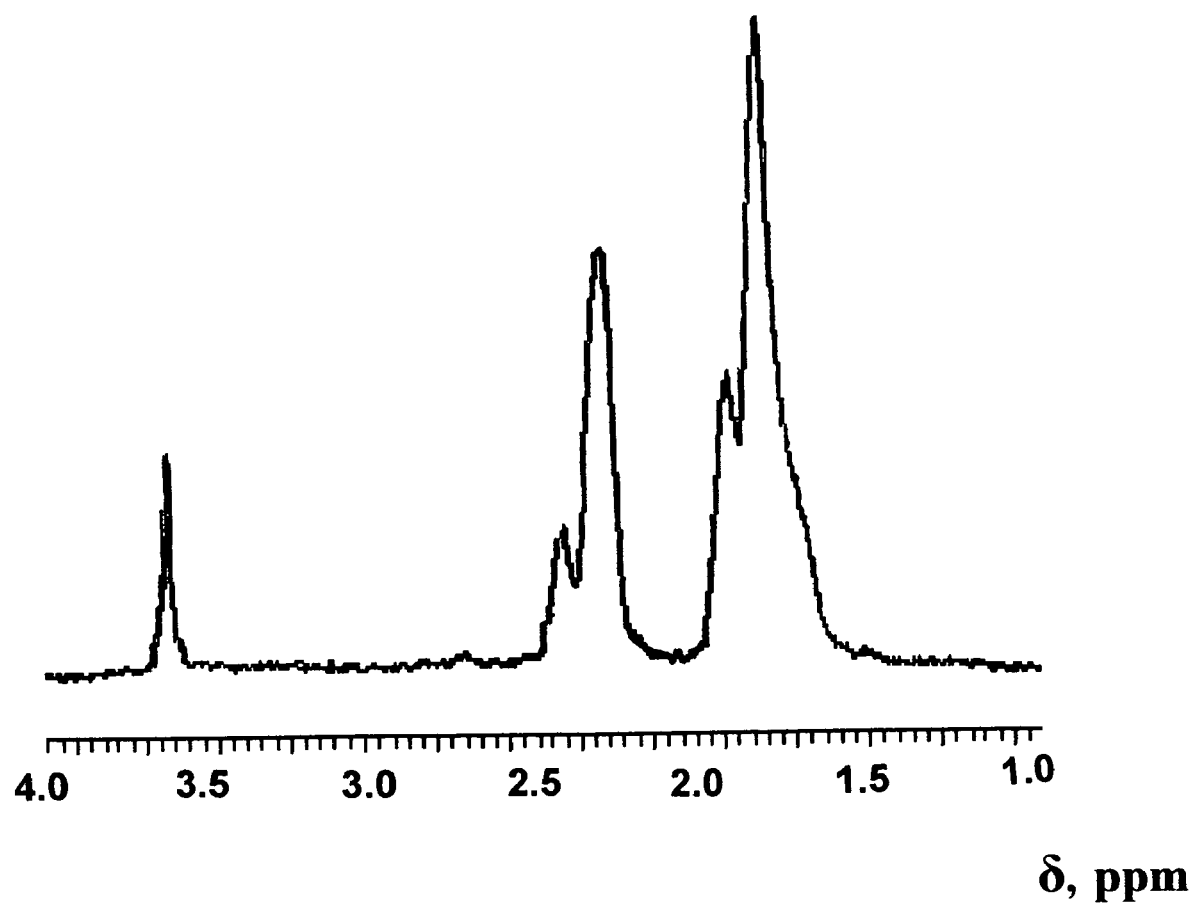

The poly(ethylene oxide) (PEO)-based solid polymer electrolytes have many potential applications in solid-state lithium batteries and dye-sensitized solar cells. In the last case a polymer layer should provide not only a high ionic conductivity of salts dissolved but also a large interfacial contact area between electrolyte and nanocrystalline dye thus increasing the energy conversion efficiency.

Crystallization of PEO chains lowers sharply the mobility of their segments and leads to decrease in an ionic conductivity of solid polymer electrolyte.

That is why many efforts were undertaken to transfer PEO chains in an amorphous state. One of the known ways to resolve this problem is grafting to PEO ends of two amorphous polymer blocks (even thermodynamically immiscible with PEO) with a certain critical chain length, sufficient to deprive PEO chains of crystalline properties. Essentially more perspective approach consists in creation of other type triblock copolymers, which amorphous side chains are capable to cooperative interaction with a central PEO block that is can form the intramolecular polycomplexes (IntraPC).

In the present invention we used IntraPCs as PEO-containing matrix. These IntraPC are formed in the double hydrophilic block and graft copolymers, which contain the chemically complementary components and combine properties of the block-type copolymers with properties of InterPC. Interacting components are additionally connected in IntraPC by covalent bond due to this they can demonstrate higher stability in many competitive processes, which accompany a formation of the multicomponent polymer electrolytes. Moreover, IntraPCs are high efficient bindings as InterPCs. Such properties of a polymer matrix were used in the present invention to form the polymer electrolytes with an ionic conductivity.

In a present invention we solve the problem of the high electrochemical properties of the IntraPC forming PAAm-b-PEO-b-PAAm triblock copolymers that could be used for DSSC solar cells, organic solar cells and lithium batteries.

The electrochemical properties of the developed electrolyte are determined by the structure of the IntraPC forming triblock copolymers based on PEO and polyacrylamide (PAAm). Two PPAm-b-PEOb-PAAM samples with $M_{vPEO}=1.4 \cdot 10^4$ (TBC1) and $3.5 \cdot 10^4$ (TBC2), and comparable length of PEO and both PAAm blocks were used for this purpose.

Results of researches of the temperature transitions in a bulk structure of the triblock copolymers by using differential scanning calorimetry (DSC) and compared with those in the structure of individual PAAm and poly(ethylene glycol) samples show that only a single glass transition with $T_g$ value some lower than that in pure PAAm was observed in DSC thermograms of TBC1 and TBC2. These results confirm that the phenomenon of full loss bt PEO chains their ability to crystallize in TBC structure stipulated mainly by hydrogen-bonding interaction between side and central block. Using the Couchman-Karasz relation the $T_{g-}$ composition analysis was carried out for both copolymers.

In the present invention a no obvious effect of a production of the electrolytes with high ionic conductivity, which are based on PAAm-b-PEO-b-PAAm triblock copolymers, containing PAAm as amorphous component and forming IntraPC, and also of the multicomponent systems with TBC participation is represented. Due to existence of both the long amorphous PAAm chains and the IntraPC formation, TBC structure preserved an amorphous character also at a high length of the central block (up to $M_{vPEO} \sim 1 \cdot 10^5$). This fact is dominant for a production of electrolytes based on pure TBC films and TBC films doped by ionic components. For example, the electrolyte for DSSC is doped by the couple $KJ/J_2$ unlike to electrolyte for Li devices, which is filled by Li salts.

TBC structure in a bulk and in a solution is stabilized by the system of intra- and intermolecular hydrogen bonds having a high thermostability, that allows attributing the given TBCs to the class of IntraPCs. PAAm-b-PEO-b-PAAm triblock copolymers form IntraPC by the system of hydrogen bonds between oxygen atoms of PEO and trans-multimers of PAAm amide groups. Additionally, amide groups of the same and different PAAm chains form a strong cis-trans-multimers.

Due to existence of long side PAAm chains and their interaction with a central crystallizable block of PEO, TBC bulk structure is amorphous and fully homogeneous. It can be represented as a totality of hydrogen-bonded segments of both polymer components, uniformly distributed in PAAm matrix.

Even the solvent-free films of pure TBC show a high ionic conductivity that can be attributed to i) their homogeneous amorphous structure, where polymer units keep a large mobility, and ii) high hydrophility of PAAm chains due to adsorption of 4 water molecules by every amide group.

EXAMPLES

The Examples described below are provided for illustration purposes only and are not intended to limit the scope of the invention.

Example 1

In TBC synthesis poly(ethylene glycol) with $M_v=1.4 \cdot 10^3$ (PEG1) and $3.5 \cdot 10^3$ (PEG2) from "Aldrich" (USA), cerium ammonium nitrate (initiator) from the same firm, and also acrylamide (AA), re-crystallized of chloroform, from "Merck" (Germany) were used. The synthesis was carried out in water medium by the method of a radical block copolymerization with participation of PEO macrobiradicals, forming in result of redox reaction between terminals —OH groups of polyethers and $Ce^{IV}$ ions. The ratio $[Ce^{IV}]/[ПЭГ]=2$ and the monomer concentration $[AA]=1$ mol·$dm^{-3}$ were used for both PEG samples. The ratio $[Ce^{IV}]/[AA]$ was equal to $6.29 \cdot 10^{-3}$ and $2.52 \cdot 10^{-3}$ in the cases of PEG1 and PEG2 consequently. The reaction blend was intermixed in an inert atmosphere at 20° C. for 24 h. Homopolymerization of AA was carried out in analogous conditions, using ethanol instead PEG for the radical process initiation. The samples of TBC1, TBC2, TBC3, TBC4 and PAAm obtained were re-precipitated of acetone, dissolved in water and freeze dried.

Example 2

In order to confirm a chemical structure of TBCs and to determine the molecular weight of PAAm blocks and whole TBC macromolecules, NMR spectroscopy was applied. $^1H$ NMR spectra in $D_2O(C=10$ kg·$m^{-3})$ were recorded at 400 MGz and 20° C., using Mercury-400 instrument from "Varian" (USA). The chemical shifts (δ) for $^1H$ nuclease were determined relatively to the signal of tetramethylsilane as a standard. $^1H$ NMR spectrum for one of TBC samples compared to PEG and PAAm spectra ($M_{wPAAm}=8.1 \cdot 10^4$, $M_w/M_n=1.38$) is shown in FIG. 1. Interpretation of the spectra was carried out in accordance with an atlas of NMR spectra. PEG spectra demonstrated the only proton signal of methylene groups (a) of oxyethylene units with δ=3.68 ppm (FIG. 1 a), excluding the signal of $H_2O$-$d_2$ with δ=4.80 ppm, which wasn't shown in the figure. At the spectrum of PAAm (FIG. 1 b) two signal groups in the regions of δ=1.4-1.8 and 2.1-2.4 ppm, which corresponded consequently to protons of methylene (b) and methyne (c) groups of acrylamide units, were observed. The presence of PEO and PAAm blocks in the triblock copolymer macromolecules was confirmed by an existence of all the signals pointed (a, b and c) in TBC spectra (FIG. 1 c). Using the integral intensities (A) of the proton signals such as a and b or a and c, and also the molecular weights of PEGs, the number-averaged molecular weights of PAAm blocks in TBC samples were calculated, according to the following formulas:

$$M_{n \cdot PAAm} = \frac{I_{0 \cdot PAAm} \cdot M_{PEG} \cdot A_b}{I_{0 \cdot PEG} \cdot A_a} \quad (1)$$

or $$M_{n \cdot PAAm} = \frac{2 \cdot I_{0 \cdot PAAm} \cdot M_{PEG} \cdot A_c}{I_{0PEG} \cdot A_a}, \quad (2)$$

where $M_{0\ PEG}$ и $M_{0\ PAAm}$—the molecular weights of PEG and PAAm units. The molecular parameters of TBC, found in such a way, are represented in Table 1.

TABLE 1

The main molecular parameters of the triblock copolymers

| Co-polymer | $M_{vPEO} \cdot 10^{-6}$ | $M_{nPAAm} \cdot 10^{-6}$ | $M_{TBC} \cdot 10^{-6}$ | $w_{PEO}$, mass % |
|---|---|---|---|---|
| TBC1 | 0.014 | 0.266 | 0.545 | 2.6 |
| TBC2 | 0.035 | 1.095 | 2.225 | 1.6 |
| TBC3 | 0.035 | 1.823 | 3.681 | 1.0 |
| TBC4 | 0.035 | 0.594 | 1.223 | 2.9 |

Notes:
$M_{vPEO}$ and $M_{TBC}$ are the molecular weights of PEO blocks and TBC macromolecules correspondingly; $w_{PEO}$ is the mass fraction of PEO in TBC.

Example 3

The bulk structure of TBC1 and TBC2 compared to that of PEG1 and PEG2 was characterized first of all by the different scanning calorimetry (DSC), using DSC-210 microcalorimeter and "Du Pont"-1090 (USA) thermoanalyzer. In order to determine parameters of the structural transitions, the instrument was calibrated by indium and zinc. Additionally, the crystal of a sapphire was heated together with the polymers to re-calculate the heat flow curves to the temperature dependences of the specific heat capacity, $C_p$. The polymer samples (~10 mg), dried at 80° C. first in vacuum case and then in vacuum-desiccator above $CaCl_2$, were placed in the open capsules, cooled by liquid nitrogen and heated with a rate of 16 degree/min.

DSC thermograms of PEG 1 and PEG2 were analogous one to another and also to thermograms, obtained earlier for the polyether samples with near $M_v$ values, therefore, they wasn't shown. These thermograms demonstrated only an intense melting peak of the crystalline regions with $T_m$=68-70° C. (1-st scan) and 64-65° C. (2-nd scan). The numbers of $X_{cr}$, calculated according to $\Delta H_m$ values, were equal to 88% and 80-83% in the 1-st and 2-nd scans consequently.

Figure 2:
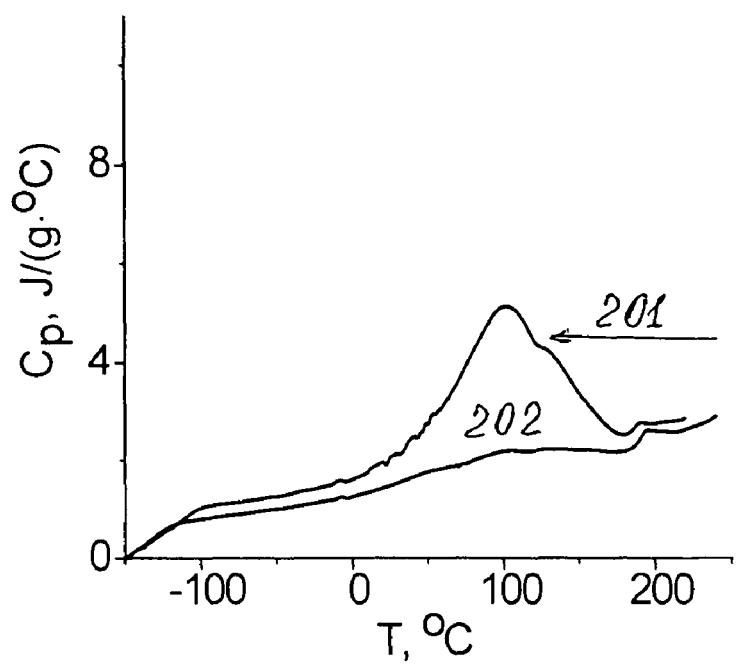
FIG. 2a illustrates dependence of heat capacity on the temperature (1-st—201 and 2-nd—202 scans) for TBC1
FIG. 2b illustrates dependence of heat capacity on the temperature (1-st—203 and 2-nd—204 scans) for TBC2.
Figure 2:
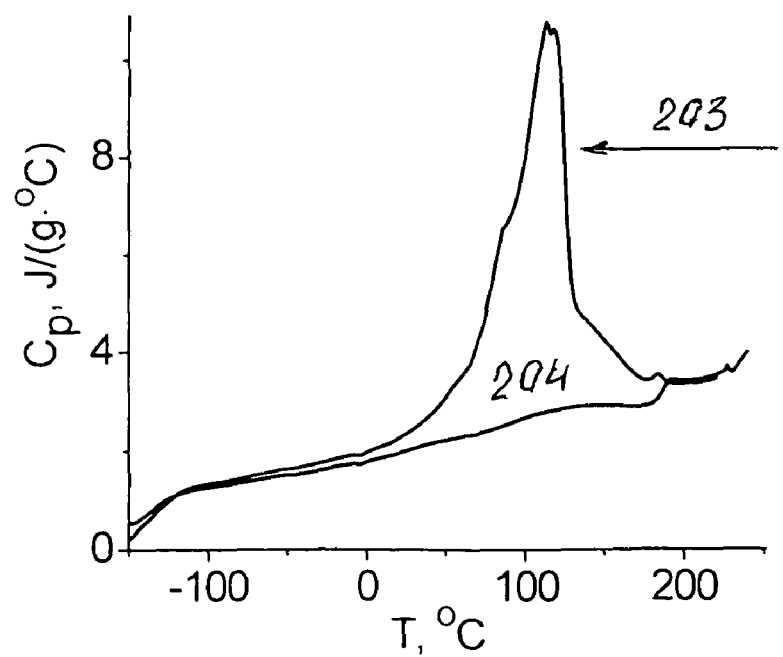

Thermograms of TBC (1-st and 2-nd scans) are shown in FIG. 2. They contain an intense peak of water evaporation near T~100° C. and one glass transition with such parameters: $T_g$=188.7° C., $\Delta T$=5.4° C., $\Delta C_p$=0.47 J·(g·° C.)$^{-1}$ for TBC1 (2-nd scan) and $T_g$=185.9° C., $\Delta T$=5.2° C., $\Delta C_p$=0.57 J·(g·° C.)$^{-1}$ for TBC2.(2-nd scan). The data received indicate the whole compatibility of polymer components and the absence of PEO crystalline regions in TBC structure. Basing on these results, the amorphous structure of TBC 1 and TBC2 can be represented as a totality of domains, formed by the H-bonded PEO and PAAm segments, which are distributed in PAAm matrix.

Example 4

Using $T_g$ and $\Delta C_p$ values for PEG ($T_{g1}$=−57° C. and $\Delta C_{p1}$=0.25 J·(g·° C.)$^{-1}$) of literature and for PAAm ($T_{g2}$=190.9° C. and $\Delta C_{p2}$=0.55 J·(g·° C.)$^{-1}$) of our data, and also the mass fractions $w_1$ and $w_2$ for both the components in TBC (Table 1), $T_g$-composition analysis was carried out according to Kouchman-Karasz relation, which was developed for a compatible polymer blend:

$$\ln\left(\frac{T_g^*}{T_{g1}}\right) = \frac{w_2 \cdot \Delta C_{p2} \cdot \ln(T_{g2}/T_{g1})}{w_1 \cdot \Delta C_{p1} + w_2 \cdot \Delta C_{p2}} \quad (3)$$

$T_g$ values, calculated according to formula (3) for PEO and PAAm blends with the same contents as in TBC1 and TBC2 ($T_g^*$=186.8 and 188.3° C.), were in a good agreement with $T_g$ numbers, which were experimentally found for TBCs. Thus, the conclusion about a high compatibility of the polymer components in an amorphous TBC structure was confirmed.

Example 5

The evidence of a fully homogeneous amorphous TBC structure was obtained due to additional structural investigations, carried out by the wide-angle X-ray scattering (WAXS) and the small-angle X-ray scattering (SAXS).

WAXS profiles for TBCs were received, using X-ray difractometer DRON-2.0. Polymer films with l=80÷115 μm were cast from aqueous solutions on Teflon surface and dried in a vacuum case for one week. The film piles with thickness ~1 mm were used for measurements. The monochromatic Cu—$K_\alpha$ radiation with λ=0.154 nm filtered by Ni was provided by the IRIS-M7 generator at an operating voltage of 30 kV and a current of 30 mA. The scattering intensities were measured by a scintillation detector scanning in 0.2° steps over the range of angles of 3-40°. Diffraction curves obtained were reduced to equal intensities of the primary beam and equal values of the scattering volume by the usual technique.

SAXS experiments with TBCs were conducted on an automated Kratky slit-collimated camera. Here copper anode emission, monochromated by total internal reflection and nickel filter, was used. The intensity curves were recorded in the step-scanning mode of the scintillation detector in a region of the scattering angles 2θ=0.03-4.0□, that corresponds to the values of the wave vector q=4π sin θ/λ from 0.022 to 2.86 nm$^{-1}$. Thus, studying of microheterogeneous domains with a characteristic dimension (evaluated as 2π/q) from 2 to 280 nm was possible. Preliminary processing of SAXS profiles was carried out using the FFSAXS-3 program. To reduce the SAXS data to the absolute scale a standard Lapolene sample was used.

Figure 3A:
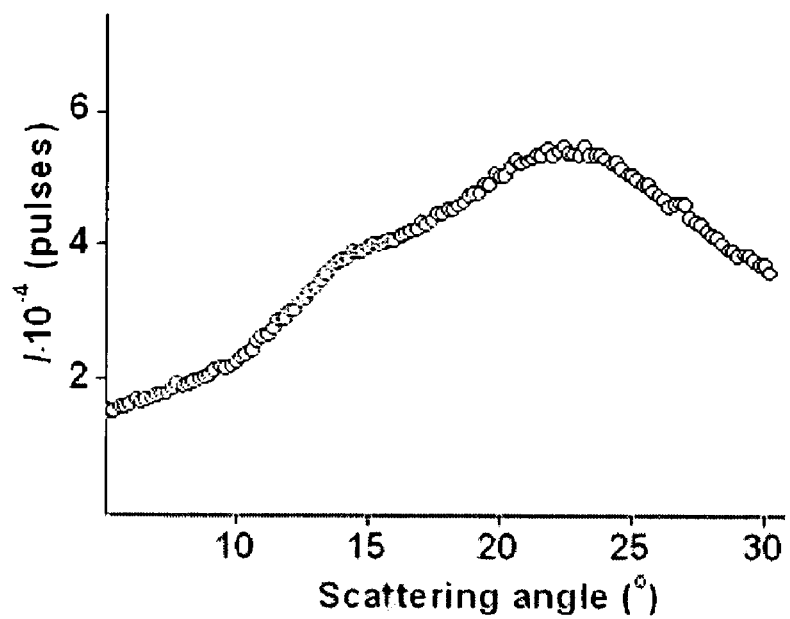
FIG. 3a illustrates dependence of the intensity of the wide-angle X-ray scattering vs the scattering angle (WAXS profile) for TBC2
Figure 3B:
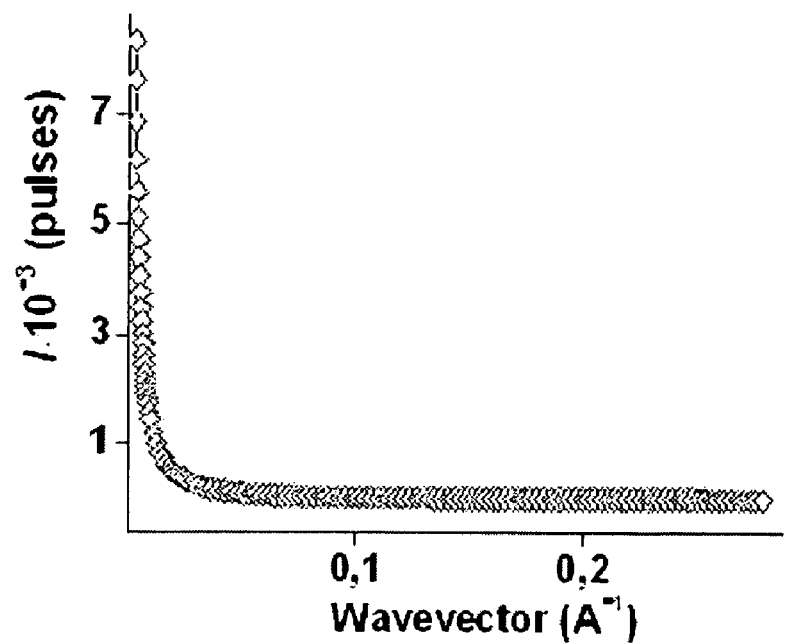
FIG. 3b illustrates dependence of the intensity of the small-angle X-ray scattering vs the scattering vector (SAXS profile) for TBC2.
Figure 4:
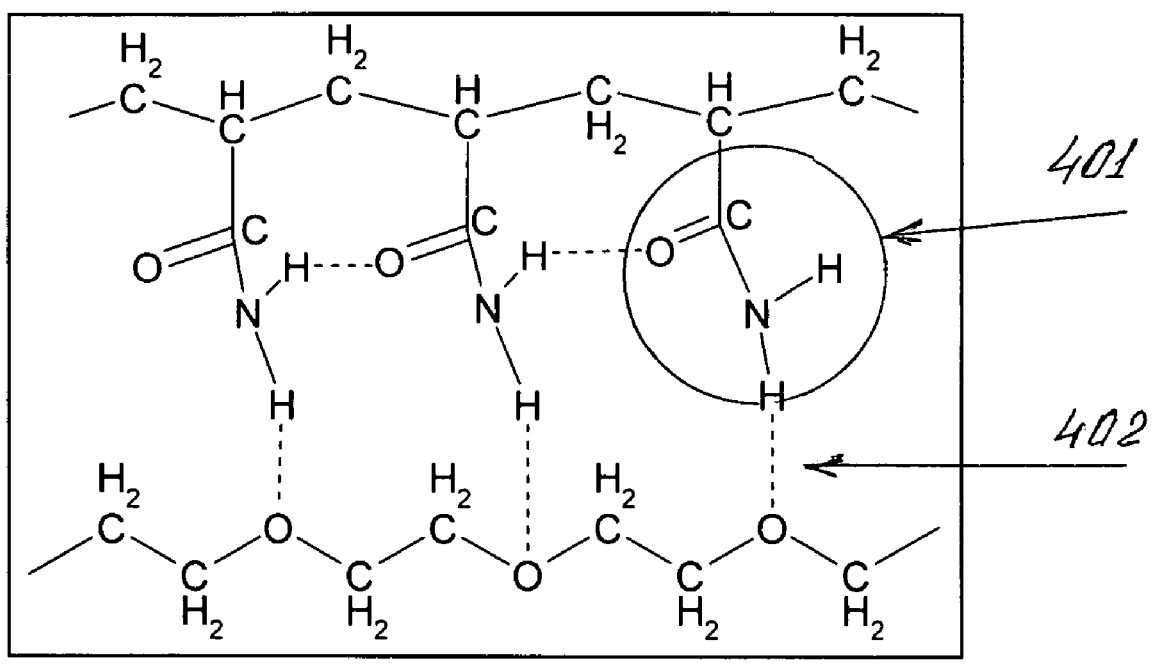
FIG. 4 shows formation of intramolecular polycomplex in TBC macromolecule. 401 is the trans-multimers of amide groups. 402 is the system of hydrogen bonds between PEO and PAAm blocks.

WAXS and SAXS profiles for one of TBC samples are shown in FIG. 3. The data, obtained for other TBC sample, were analogous. It is well known that WAXS profile of PEG demonstrate two sharp intense crystalline peaks at the scattering angle θ=19.0□ and 23.1□. Unlike this, in WAXS difractograms of TBCs only two diffusive overlapped maximums were observed (FIG. 3 a), that can be attributed to the presence of two systems of planes of the paracrystalline lattice in an amorphous TBC structure. The first maximum with a smaller intensity (θ~15□) characterized the lateral periodicity in an arrangement of PAAm chains. The second one with a greater intensity (2θ=22.1□) was caused by a periodic arrangement of the flat hydrogen-bonded cis-dimmers of amide groups in the structures of cis-trans-multimers. Similar two diffusive maximums (with smaller and greater intensity) in WAXS difractograms were characteristic for pure PAAm. Some difference consisted in an appreciable reduction of the relative intensity of the second maximum and also in alteration of its position (FIG. 3, Table 3). This effect suggested the changes in disposition of cis-dimmers of amide groups in the structures of cis-trans-multimers of TBCs compared with PAAm.

SAXS profiles for both TBCs (one example in FIG. 3 b) demonstrated a sharp decay of the scattering intensity versus the wave vector without appearance of any peaks or "halos". This fact suggested the absence of any periodicity in a disposition of separate structural elements of TBCs (similar to paracrystalline lattice) at a supramolecular level. Thus, the homogeneity of TBC structure on different levels was fully proved.

Example 6

The films of TBC2, doped by electrolyte (the couple $KJ/J_2$ with the constant molar ratio 1.83), were cast of aqueous solutions ($C_{TBC}$=40.3 kg·m$^{-3}$) on the Teflon surface and dried on air during 3-4 days. The electrolyte content in the initial solution in respect of TBC was varied (Table 2).

The films obtained with dimension ~5×5 cm and thickness 90-110 μm had homogeneous brown coloration. The ionic conductivity was determined by an impedance spectroscopy. All the experiments were carried out in a special cell with Pt electrodes in the frequency region 0.001-100 kGz at T=20° C., using the instrument Voltalab with a computer program Voltalab Master. The following measuring regimes were applied:

Regime A. Dry film was squeezed between electrodes in a cell.

Regime B. Dry film was squeezed between electrodes moistened by liquid. In this case a high adhesion between electrodes and film was observed.

Regime C. Initial procedure was analogous to the regime B but all the measurements were carried out without a cell, using the electrodes "stuck" together by a film. The effect of swelling was observed in the humid films (Table 2).

TABLE 2

Characteristics of the ionic conductivity of pure and doped triblock copolymer

| System | [PEO]/[KJ] base-mol·mol$^{-1}$ | [TBC]/[KJ] base-mol·mol$^{-1}$ | Measuring procedure | l, μm | R, Ω | $\sigma_{d,C}$, S·cm$^{-1}$ |
|---|---|---|---|---|---|---|
| TBC2 | — | — | A | 90 | $2 \cdot 10^3$ | $2.9 \cdot 10^{-6}$ |
|  |  |  | B | 160 | 26 | $4 \cdot 10^{-4}$ |
|  |  |  | C |  | 27 | $3.8 \cdot 10^{-4}$ |
| TBC2 + KJ/J$_2$ | 1.5 | 59.5 | A | 100 | $2 \cdot 10^3$ | $3.2 \cdot 10^{-6}$ |
|  |  |  | B | 130 | 1 | $8.4 \cdot 10^{-3}$ |
|  |  |  | C |  | 0.9 | $9.4 \cdot 10^{-3}$ |
| TBC2 + KJ/J$_2$ | 0.8 | 29.6 | A | 100 | $1.8 \cdot 10^3$ | $3.6 \cdot 10^{-6}$ |
|  |  |  | B | 140 | 1.5 | $6.1 \cdot 10^{-3}$ |
|  |  |  | C |  | 1.6 | $5.7 \cdot 10^{-3}$ |
| TBC2 + KJ/J$_2$ | 0.5 | 19.7 | A | 110 | $2 \cdot 10^3$ | $3.6 \cdot 10^{-6}$ |
|  |  |  | B | 100 | 1.2 | $5.4 \cdot 10^{-3}$ |
|  |  |  | C |  | 1.2 | $5.4 \cdot 10^{-3}$ |
| TBC2 + KJ/J$_2$ | 0.4 | 14.8 | A | 90 | $2 \cdot 10^3$ | $2.9 \cdot 10^{-6}$ |
|  |  |  | B | 110 | 0.9 | $8 \cdot 10^{-3}$ |
|  |  |  | C |  | 0.8 | $8.9 \cdot 10^{-3}$ |

Notes:
The ratios [PEO]/[KJ] and [TBC]/[KJ] reflect the quantities of PEO or TBC units per one KJ molecule in the initial blend;
the designations A, B, C show the measuring procedure, described in the text;
l is the thickness of polymer film between electrodes;
R is the volume resistance;
$\sigma_{d,C}$ is the specific ionic conductivity.

Frequency dependences of imaginary (Z″) and real (Z′) parts of the complex impedance (Nyquist diagrams) for pure and doped by KJ/J$_2$ films of TBC2 was used for obtaining the value of resistance. Volume resistances of the films at infinitely high frequency were determined due to an extrapolation of the impedance data to Z′-axis in the manner, usual in the studies of polymer electrolytes. The specific ionic conductivity was calculated of relation:

$$\sigma_{d,C} = \frac{1}{R \cdot S}, \qquad (4)$$

where l is the film thickness, cm; S is the electrode area, cm$^2$; R is the volume resistance of a film, Ω. The results obtained are shown in the right part of Table 2.

It is seen, that even a dry film of pure TBC2 demonstrated a high level of the ionic conductivity. This can be explained by following. Firstly, both the polymer components of TBC possess a high hydrophility that results in keeping ~10% moisture even in a carefully dried film. Actually, every oxygen atom of PEO is capable to adsorb 2 water molecules, whereas every amide group of PAAm is capable strongly connect 4 water molecules. Further, PEO chains loss their ability to crystallize due to an interaction with PAAm that maintains their mobility and promotes to a conductivity growth. Introduction of KJ/J$_2$ results in increase of the dry film conductivity in 10-24%, at the same time the highest effects were observed at the film examinations in the regimes B and C, that is in swelled films. Really, a conductivity value rose in two orders in the swelled TBC2 films compared to a dry film.

The following increase in conductivity more than in order was achieved in the swelled films containing electrolyte. The best result was equal $\sigma_{d,C}=9.4 \cdot 10^{-3}$ S·cm$^{-1}$. Alteration in KJ/J$_2$ content in the films (in the limits pointed in Table 2) didn't practically influence to their conductivity. This indicates possibility for further lowering of the electrolyte content in the swelled TBC matrix at the keeping of a high level of ionic conductivity.

Thin films (~0.80-150 μm) of the pure triblock copolymers and their blends with the couple KJ/J$_2$ showed high level of an ionic conductivity within $2 \cdot 10^{-6}$-$9.4 \cdot 10^{-3}$ S·cm$^{-1}$.

Example 7

The films of TBC3, doped by electrolyte (a salt LiPF$_6$), were cast of aqueous solutions (C$_{TBC}$=21.4 kg·m$^{-3}$) on the Teflon surface and dried on air during 3-4 days. The electrolyte content in the initial solution in respect of TBC was varied (Table 2). In two cases a plasticizer (Pl) such as non-ionic ethylenglycol with the constant mass fraction (1% with respect to the initial mass of TBC) was used (Table 2). Considerable increase in the film elasticity took place due to LiPF$_6$ and Pl additives.

All the films with dimension ~5×5 cm and thickness in the range 100-170 μm were colorless and had a considerable transparence. The specific ionic conductivity of the films was also measured by an impedance spectroscopy. Experimental methodology was the same as earlier (Example 6). The volume resistance of films, needed for the specific conductivity calculation, was determined of impedance spectra, using two procedures:

Procedure A. Linear extrapolation of experimental data to the abscissa axis in the region of high frequencies was carried out.

Procedure B. The high frequency semicircles, observed in some impedance diagrams, were extrapolated to the abscissa axis.

The results are represented in the right part of Table 3

TABLE 3

Ionic conductivity of the triblock copolymer doped by Li salt

| System | [PEO]/[LiPF$_6$] base-mol·mol$^{-1}$ | [TBC]/[LiPF$_6$] base-mol·mol$^{-1}$ | l, μm | Calculating procedure | $\sigma_{d,C}$, S·cm$^{-1}$ |
|---|---|---|---|---|---|
| TBC3 + LiPF$_6$ | 0.15 | 10.0 | 100 | A | 7.52·10$^{-6}$ |
| TBC3 + LiPF$_6$ | 0.09 | 5.7 | 125 | B | 1.43·10$^{-5}$ |
| TBC3 + LiPF$_6$ | 0.06 | 4.0 | 109 | A | 1.74·10$^{-5}$ |
|  |  |  |  | B | 1.93·10$^{-5}$ |
| TBC3 + LiPF$_6$ + Pl | 0.15 | 10.0 | 161 | A | 8.67·10$^{-6}$ |
|  |  |  |  | B | 2.22·10$^{-5}$ |
| TBC3 + LiPF$_6$ + Pl | 0.06 | 4.0 | 170 | A | 1.53·10$^{-4}$ |

Notes:
The ratios [PEO]/[LiPF$_6$] and [TBC]/[LiPF$_6$] correspond to the numbers of PEO or TBC units per one LiPF$_6$ molecule in the initial blend; the designations A and B refer to the calculating procedures, described in the text;
l is the average thickness of a polymer film between electrodes;
$\sigma_{d,C}$ is the specific ionic conductivity.

The results which are represented in the right part of Table 3 demonstrate considerable increase in the ionic conductivity of the composition polymer films with growth of the Li-salt concentration. This effect isn't surprising taking into account the above-mentioned plasticizing action of LiPF$_6$ additives on TBC3 film structure. Introduction of a small quantity of the nonionic plasticizer not only improves elasticity of the films but also essentially raises their conductivity. According to the data of Table 3, both the factors act in the same direction. It is seen, that due to applying of TBC films, doped by Li-salt and small additive of the nonionic plasticizer, a high level of the ionic conductivity (1.53·10$^{-4}$ S·cm$^{-1}$) can be achieved.

Example 8

The compositional triblock copolymer electrolyte for the Li-ion batteries, including nanometer-scale monodispersed TiO$_2$ particles, was developed on the base of TBC4 sample (Table 1), LiPF$_6$ salt and TiO$_2$ sol with a size of particles 7-10 nm. Monodispersed sol was obtained by stirring of the polydispersed TiO$_2$/water suspension during 24 h followed by its consequent double centrifugation at ω=6·10$^3$ rot/min for 15 min. All the components with a certain relation were mixed in aqueous medium during 1 h, and then corresponding compositional films were cast on the Teflon surface. Concentration of TBC4 was constant (C=21.56 kg·m$^{-3}$) but the contents of Li salt and TiO$_2$ sol was changed. One of the compositional films contained additionally the above (Example 7) nonionic plasticizer (1% in respect of the initial TBC mass). Introduction of TiO$_2$ nanometer-scale particles essentially enhanced (on 30-50%) the film elasticity. This effect was also strengthened by the plasticizer introduction. The films possessed by fully homogeneous structure and relatively high transparency. The conductivity of the film conductivity increases by 20-30%

CLOSURE

While various embodiments of the present invention have been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. A solid polymer electrolyte comprising a block copolymer comprising a polyethylene oxide (PEO) block and two chemically complementary proton donor blocks, wherein said PEO block and said chemically complementary proton donor blocks form a hydrogen bonded intramolecular polycomplex with an amorphous homogeneous bulk structure.

2. The solid polymer electrolyte of claim 1 wherein said block copolymer comprises a linear triblock copolymer with a central block of PEO and two side blocks of chemically complementary polyacrylamide (PAAm) or poly(acrylic acid) (PAAc).

3. The solid polymer electrolyte of claim 2 wherein said block copolymer comprises PAAm-b-PEO-b-PAAm triblock copolymer and wherein the molecular weight of PEO in the PAAm-b-PEO-b-PAAm triblock copolymer is in the range 1·10$^4$<molecular weight of PEO<1·10$^5$.

4. The solid polymer electrolyte of claim 2 wherein the ratio between the average polymerization degrees of the side and central blocks, P$_{nPAAm}$/P$_{nPEO}$, is in the range from 0.5 to 20.

5. The solid polymer electrolyte as in claim 1 or 2, wherein said triblock copolymer comprises an amorphous homogeneous bulk structure over a temperature range of −50° C. to 80° C.

6. The solid polymer electrolyte as in claim 5, wherein said amorphous homogeneous bulk structure of the triblock copolymers is stabilized by the hydrogen bonds between poly(ethylene oxide) and PAAm or PAAc blocks and between PAAm or PAAc segments which are not bonded to poly(ethylene oxide) blocks.

7. The solid polymer electrolyte as in claim 5, wherein said amorphous homogeneous bulk structure of the triblock copolymers is characterized by its glass transition temperature and by the absence of a microphase separation and periodicity in a disposition of separate structural elements at a supramolecular level.

8. The solid polymer electrolyte as in claim 5, wherein said block copolymer comprises PAAm-b-PEO-b-PAAm triblock copolymer and wherein the bulk structure of the PAAm-b-PEO-b-PAAm triblock copolymers is glassy and thermostable within a temperature range from about −100° C. to about 180° C.

9. The solid polymer electrolyte as in claim 5 wherein the amorphous homogeneous bulk structure is formed by evaporation of an aqueous solution comprising the components of the solid polymer electrolyte.

10. The solid polymer electrolyte as in claim 5 wherein the amorphous homogeneous bulk structure is formed by evaporation of a mixed aqueous/organic solution comprising the components of the solid polymer electrolyte.

11. The solid polymer electrolyte of claim 1 further comprising an ion conductive material.

12. The solid polymer electrolyte of claim 11 wherein said ion conductive material comprises a low-molecular-weight electrolyte in the triblock copolymer matrices for dye-sensitized solar cells comprising redox couple $KJ/J_2$.

13. The solid polymer electrolyte of claim 12 wherein the molar ratio in the redox couple $KJ/J_2$ is from 0.5:3 to 3:0.5.

14. The solid polymer electrolyte of claim 12 wherein said block copolymer comprises PAAm-b-PEO-b-PAAm triblock copolymer and the ratio of KJ to block copolymer is from 10 to 60 (base-mol/mol).

15. The solid polymer electrolyte of claim 11 wherein the ion conducting material comprises a low-molecular-weight electrolyte comprising a salt based on Li ion.

16. The solid polymer electrolyte of claim 15 wherein said block copolymer comprises PAAm-b-PEO-b-PAAm triblock copolymer and the ratio between said PAAm-b-PEO-b-PAAm triblock copolymer and said Li salt is from 4 to 10 base-mol/mol.

17. The solid polymer electrolyte of claim 1 further comprising an organic plasticizer.

18. The solid polymer electrolyte of claim 17 wherein the organic plasticizer comprises a non-aqueous organic solvent.

19. The solid polymer electrolyte of claim 18 wherein said block copolymer comprises PAAm-b-PEO-b-PAAm triblock copolymer and wherein the weight fraction of non-aqueous organic solvent to the PAAm-b-PEO-b-PAAm triblock copolymer is 0.5 wt %-5 wt %.

20. The solid polymer electrolyte of claim 1 further comprising nanometer-scale monodispersed inorganic particles.

21. The solid polymer electrolyte of claim 20 wherein the nanometer-scale monodispersed inorganic particles in the triblock copolymer matrices are selected from the group consisting of oxides of titanium, aluminum, zirconium, and silicon.

22. The solid polymer electrolyte of claim 21 wherein said block copolymer comprises PAAm-b-PEO-b-PAAm triblock copolymer and wherein the weight fractions of nanometer-scale monodispersed inorganic particles to the weight of PAAm-b-PEO-b-PAAm triblock copolymer is from 0.1 wt % to 0.5 wt %.

23. The solid polymer electrolyte of claim 1 further comprising at least one of an ion conductive material, an organic plasticizer and nanometer-scale monodispersed inorganic particles.

* * * * *